(12) United States Patent
Fawaz et al.

(10) Patent No.: US 11,816,144 B2
(45) Date of Patent: Nov. 14, 2023

(54) HAIR PATTERN DETERMINATION AND FILTERING

(71) Applicant: Pinterest, Inc., San Francisco, CA (US)

(72) Inventors: Nadia Fawaz, Santa Clara, CA (US); Anh Tuong Ta, Orinda, CA (US); Bhawna Juneja, Belmont, CA (US); Rohan Mahadev, New York, NY (US); Valerie Moy, San Francisco, CA (US); Dmitry Olegovich Kislyuk, San Ramon, CA (US); David Ding-Jia Xue, San Francisco, CA (US); Christopher Lee Schaefbauer, Berkley, CA (US); Graham Roth, San Francisco, CA (US); William Yau, San Jose, CA (US); Jordan DiSanto, San Francisco, CA (US); Ding Zhang, San Francisco, CA (US); David Voiss, San Francisco, CA (US)

(73) Assignee: Pinterest, Inc., San Francisco, CA (US)

(*) Notice: Subject to any disclaimer, the term of this patent is extended or adjusted under 35 U.S.C. 154(b) by 0 days.

(21) Appl. No.: 17/710,451

(22) Filed: Mar. 31, 2022

(65) Prior Publication Data
US 2023/0315780 A1 Oct. 5, 2023

(51) Int. Cl.
*G06F 16/53* (2019.01)
*G06F 16/532* (2019.01)
*G06F 16/538* (2019.01)

(52) U.S. Cl.
CPC ......... *G06F 16/532* (2019.01); *G06F 16/538* (2019.01)

(58) Field of Classification Search
CPC .................. G06F 16/532; G06F 16/538
See application file for complete search history.

(56) References Cited

U.S. PATENT DOCUMENTS

| 8,270,682 B2 | 9/2012 | Stubler |
| 9,064,279 B1 | 6/2015 | Tuan et al. |
| 9,928,601 B2 | 3/2018 | Aarabi |
| 10,304,125 B1 | 5/2019 | Huisenga et al. |
| 10,866,716 B2 | 12/2020 | Sinclair et al. |
| 10,891,331 B1 | 1/2021 | Daya et al. |
| 10,943,371 B1 | 3/2021 | Voss et al. |

(Continued)

OTHER PUBLICATIONS

Muhammad et al., "Hair detection, segmentation, and hairstyle classification in the wild", Image and Vision Computing, vol. 71, Mar. 2018, pp. 25-37.

*Primary Examiner* — Baoquoc N To
(74) *Attorney, Agent, or Firm* — Athorus, PLLC

(57) ABSTRACT

Described are systems and methods to determine hair patterns presented in content items. The determined hair patterns may be associated with the content items to facilitate indexing, filtering, etc. of the content items based on the determined hair patterns. In exemplary implementations, a corpus of content items may be associated with an embedding vector that includes a binary representation of the content item. The embedding vectors associated with each content item can be provided as inputs to a trained machine learning model, which can process the embedding vectors to determine one or more hair patterns presented in each content item while eliminating the need for performing image pre-processing prior to determination of the hair pattern(s) presented in the content item.

20 Claims, 14 Drawing Sheets

(56) References Cited

U.S. PATENT DOCUMENTS

| | | |
|---|---|---|
| 11,010,894 B1 | 5/2021 | Shenk et al. |
| 11,599,739 B2 * | 3/2023 | Hayashi ................. G06V 10/82 |
| 2009/0231356 A1 | 9/2009 | Barnes et al. |
| 2014/0047389 A1 | 2/2014 | Aarabi |
| 2016/0125624 A1 | 5/2016 | Liu et al. |
| 2017/0256084 A1 | 9/2017 | Iglehart et al. |
| 2018/0075523 A1 | 3/2018 | Odizzio et al. |
| 2018/0075524 A1 | 3/2018 | Odizzio et al. |
| 2018/0315336 A1 | 11/2018 | Shen et al. |
| 2018/0350071 A1 | 12/2018 | Purwar et al. |
| 2019/0166980 A1 | 6/2019 | Huang et al. |
| 2019/0197736 A1 | 6/2019 | Sugaya |
| 2019/0244260 A1 | 8/2019 | Lin et al. |
| 2019/0377969 A1 | 12/2019 | Kuo et al. |
| 2020/0051298 A1 | 2/2020 | Nguyen et al. |
| 2020/0090256 A1 | 3/2020 | Yeh et al. |
| 2020/0265233 A1 | 8/2020 | Jeong et al. |
| 2020/0319784 A1 | 10/2020 | Sinclair et al. |
| 2021/0015240 A1 | 1/2021 | Elfakhri et al. |
| 2021/0072887 A1 | 3/2021 | Sinclair et al. |
| 2021/0158619 A1 | 5/2021 | Sokal et al. |
| 2021/0390311 A1 | 12/2021 | Barron et al. |

\* cited by examiner

HAIR PATTERN DETERMINATION AND FILTERING

BACKGROUND

The amount of accessible content is ever expanding. For example, there are many online services that host and maintain content for their users and subscribers. With the sheer volume of accessible content, it can be difficult for users to find and access relevant content. For example, identifying the proper keywords or queries to obtain relevant content can be difficult. Further, browsing content returned in response to a query to identify relevant content within search results can also be time consuming and difficult.

DETAILED DESCRIPTION

As is set forth in greater detail below, embodiments of the present disclosure are generally directed to systems and methods for determining one or more hair patterns presented in content items. The determined hair patterns may be associated with the content items to facilitate index, filtering, etc. of the content items based on the determined hair patterns. In exemplary implementations, a corpus of content items including visual representations of hair patterns may be stored and maintained. Each content item may be associated with an embedding vector that includes a binary representation of the content item. The embedding vectors associated with each content item can be provided as inputs to a trained machine learning model, which can process the embedding vectors to determine one or more hair patterns presented in each content item. Advantageously, embodiments of the present disclosure can determine hair patterns presented in a content item based on an embedding vector that is representative of the content item (e.g., in its entirety/as a whole) so as to eliminate the need for performing image pre-processing (e.g., image segmentation, background subtraction, object detection, etc.) in connection with the content item prior to determination of the hair pattern(s) presented in the content item.

In exemplary implementations, the hair patterns presented in the corpus of content items hosted and maintained by an online service may be determined to facilitate searching, filtering, indexing, etc. of the corpus of content items. For example, after the hair patterns presented in a corpus of content items has been determined, the determined hair pattern(s) may be associated with each corresponding content item from the corpus of content items. The determined and associated hair patterns can be utilized in identifying content items to present to a user of the online service in response to a query, as a recommendation based on a user history associated with the user, and the like. Accordingly, the determined hair pattern(s) associated with each of the corpus of content items can be used to facilitate searching, filtering, indexing, etc. of the corpus of content items.

Although embodiments of the present disclosure are described primarily with respect to processing content items, such as digital images, to determine, filter, index, etc. hair patterns presented in the content items, embodiments of the present disclosure can be applicable to any other features, attributes, characteristics, etc. presented in content items, such as, for example, skin tones, and the like.

Figure 1:
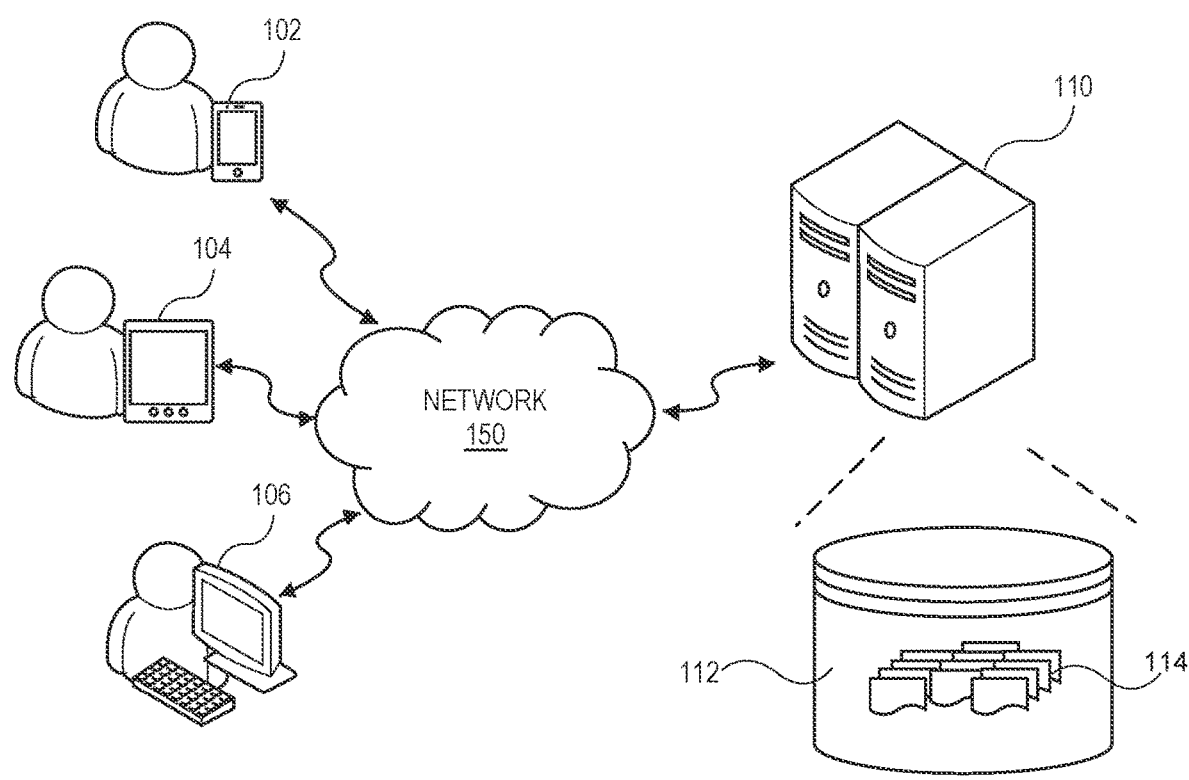
FIG. 1 is an illustration of an exemplary computing environment, according to exemplary embodiments of the present disclosure.

FIG. 1 is an illustration of an exemplary computing environment 100, according to exemplary embodiments of the present disclosure.

As shown in FIG. 1, computing environment 100 may include one or more client devices 102, 104, and/or 106, also referred to as user devices, for connecting over network 150 with online service 110, which may execute on a network computing system. Online service 110 may include and/or communicate with one or more data store(s) 112, which may be configured to store and maintain a corpus of content items 114. Content items 114 may include digital images, videos, etc. and may include a visual representation of a hair pattern (e.g., protective—tight braids, dreadlocks, cornrows, etc.—coily, curly, wavy, straight, shaved/bald, and the like) and may be associated with an embedding vector that includes a binary representation of each corresponding content item 114. Online service 110 may form at least a portion of a social media platform or environment, a networking platform or environment, an e-commerce platform or environment, or any other form of interactive computing.

Client devices 102, 104, 106 and/or online service 110 may communicate via wired and/or wireless connections to network 150. Client devices 102, 104, and/or 106 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102. 104, and/or 106 and online service 110.

In exemplary implementations, online service 110 may include one or more deep neural networks ("DNN"), or other machine learning models, that have been trained to determine one or more hair patterns represented in each of content items 114. According to exemplary embodiments of the present disclosure, the embedding vector associated with each content item 114 may be processed by the trained DNN to determine one or more hair patterns presented in each corresponding content item 114. Preferably, the embedding vectors associated with each content item 114 include a binary representation of each corresponding content item 114 such that the DNN is trained to determine hair patterns in content items 114 without performing and pre-processing (e.g., object detection, background subtraction, image segmentation, or other imaging processing) of content items 114.

After the hair patterns have been determined for content items 114, the hair pattern determined for each content item 114 may be associated and stored with each corresponding content item 114 in data store 112. The determined hair pattern(s) associated with each content item 114 can be used to facilitate searching, filtering, indexing, etc. content items 114. According to certain aspects, the determined hair pattern associated with each content item 114 may be utilized in the event that any of content items 114 are used as part of a training dataset for a machine learning system to ensure that the training dataset represents a diverse dataset with respect to hair patterns presented in the content items of the training dataset. Additionally, the determined hair pattern associated with each content item 114 can also be used in connection with one or more recommendation systems configured to recommend content items to a user (e.g., associated with client devices 102, 104, and/or 106).

As illustrated in FIG. 1, users associated with client devices 102, 104, and/or 106 may access online service via network 150. In exemplary implementations, users associated with client devices 102, 104, and/or 106 may access online service 110 to search for, access, etc. content, such as content items 114. In one exemplary implementation, a user associated with one of client devices 102, 104, and/or 106 may submit a query (e.g., a text-based query, an image query, etc.) in connection with a search for relevant content items. In addition to identifying content items relevant to the query submitted by the user, online system 110 may also process the query to determine whether the submitted query may trigger filtering of the identified content items based on hair patterns associated with content items 114. For example, the query may be analyzed to determine if the query has relevance to filtering by hair pattern (e.g., queries related to fashion, beauty, hairstyles, makeup, and the like), if the query is sufficiently generic to allow filtering by hair pattern (e.g., the query does not include keywords directed to a specific hair pattern, etc.), and the like. Accordingly, a query relating to cars or airplanes would likely not trigger filtering by hair pattern, whereas queries relating to hair styles (e.g., wedding hairstyles, prom hairstyles, etc.), fashion, looks worn by celebrities on the red carpet of an event, makeup looks, and the like may trigger filtering by hair pattern. Consequently, queries that may specify a certain hair pattern (e.g., protective, coily, curly, wavy, straight, bald/shaved, etc.) may also not trigger filtering by hair pattern. According to certain aspects of the present disclosure, determination of whether a query triggers filtering by hair pattern may be different based on geography, location, etc.

In exemplary implementations where content items responsive to a query have been identified and it has been determined that the query triggers filtering based on hair pattern, an inventory of the responsive content items in each hair pattern category may be determined. The inventory for each hair pattern category may be used to determine whether to enable filtering based on hair pattern and/or the hair pattern categories that may be made available for filtering. For example, if the determined inventory indicates that the responsive content items only include hair patterns categorized as straight, filtering based on hair pattern may not be made available since only one type of hair pattern is presented in the responsive content items. Similarly, if the determined inventory indicates that sufficient inventory exists for hair pattern types curly, wavy, protected, and straight, filtering based on hair pattern may be enabled and made available for hair pattern categories curly, wavy, protective, and straight, while filtering based on hair pattern categories coily and bald/shaved may not be made available. Accordingly, the determined inventory for each hair pattern type and/or category may be compared against a threshold to determine whether sufficient inventory exists for two or more hair pattern types and/or categories to enable and/or make filtering based on hair pattern available and/or determining which hair pattern types and/or categories to make available for filtering. In exemplary implementations, if it is determined that sufficient inventory exists for two or more hair pattern types/categories, filtering based on hair pattern may be enabled for the hair pattern types/categories for which sufficient inventory exists. The threshold value may include a predetermined value, a ratio or relative value based on the total number of responsive content items and/or the inventory for each hair pattern type/category, and the like.

In other exemplary embodiments, online service 110 may store and maintain queries that may trigger filtering of responsive content items based on hair pattern. For example, online service 110 may identify queries that may trigger filtering based on hair pattern based on the relevance of the queries to hair patterns (e.g., queries related to fashion, beauty, hairstyles, makeup, and the like, as well as whether the query is sufficiently generic to allow filtering by hair pattern—e.g., the query does not include keywords directed to a specific hair pattern, etc.) and whether the queries include sufficient inventory of responsive content items associated with at least one of the hair pattern categories so as to facilitate filtering based on hair pattern. Accordingly, the identified queries may be used to generate, store, and maintain a corpus of queries that may trigger filtering based on hair pattern, which may be periodically updated (e.g., as additional content items become available, etc.). Alternatively, if it is determined that a certain query is not relevant to filtering based on hair pattern and/or does not include sufficient inventory for one or more of the hair pattern categories, then it may be determined that the query in question does not trigger filtering based on hair pattern and may be excluded from the corpus of queries.

Accordingly, as queries are received from client devices 102, 104, and/or 106, online service 110 may process the received query to determine whether the received query is included in the corpus of maintained queries. If the received query is included in the corpus of maintained queries, filtering based on hair pattern may be triggered, whereas if the received query is not included in the corpus of maintained queries, filtering based on hair pattern may not be triggered. Additionally, in connection with received queries that are not included in the corpus of maintained queries such that filtering based on hair pattern is not triggered, online service 110 may present one or more recommended queries (e.g., as an autocomplete suggestion, etc.) from the corpus of maintained queries that may trigger filtering based on hair pattern.

In exemplary implementations where it is determined that a query submitted by a user associated with client device 102, 104, and/or 106 triggers filtering by hair pattern and sufficient inventory exists to enable filtering based on hair pattern, online service 110 may cause a user interface to be presented on a display of client device 102, 104, and/or 106 to facilitate filtering of the responsive content items based on hair pattern type. For example, the user interface may present the content items responsive to the query and a hair pattern filtering control, which can facilitate filtering of the responsive content items by hair pattern type/category.

Accordingly, a user may interact with the hair pattern filtering control via client device 102, 104, and/or 106 to select and/or deselect one or more hair pattern types/categories to filter the responsive content based on the selected hair pattern type(s). In response to the interaction with the hair pattern filtering control to select one or more of the hair pattern types/categories, the user interface may be modified to only display the content items including the selected hair pattern types/categories. The user interface facilitating filtering based on hair pattern is described in further detail herein in connection with FIGS. 3A-3G.

Figure 2:
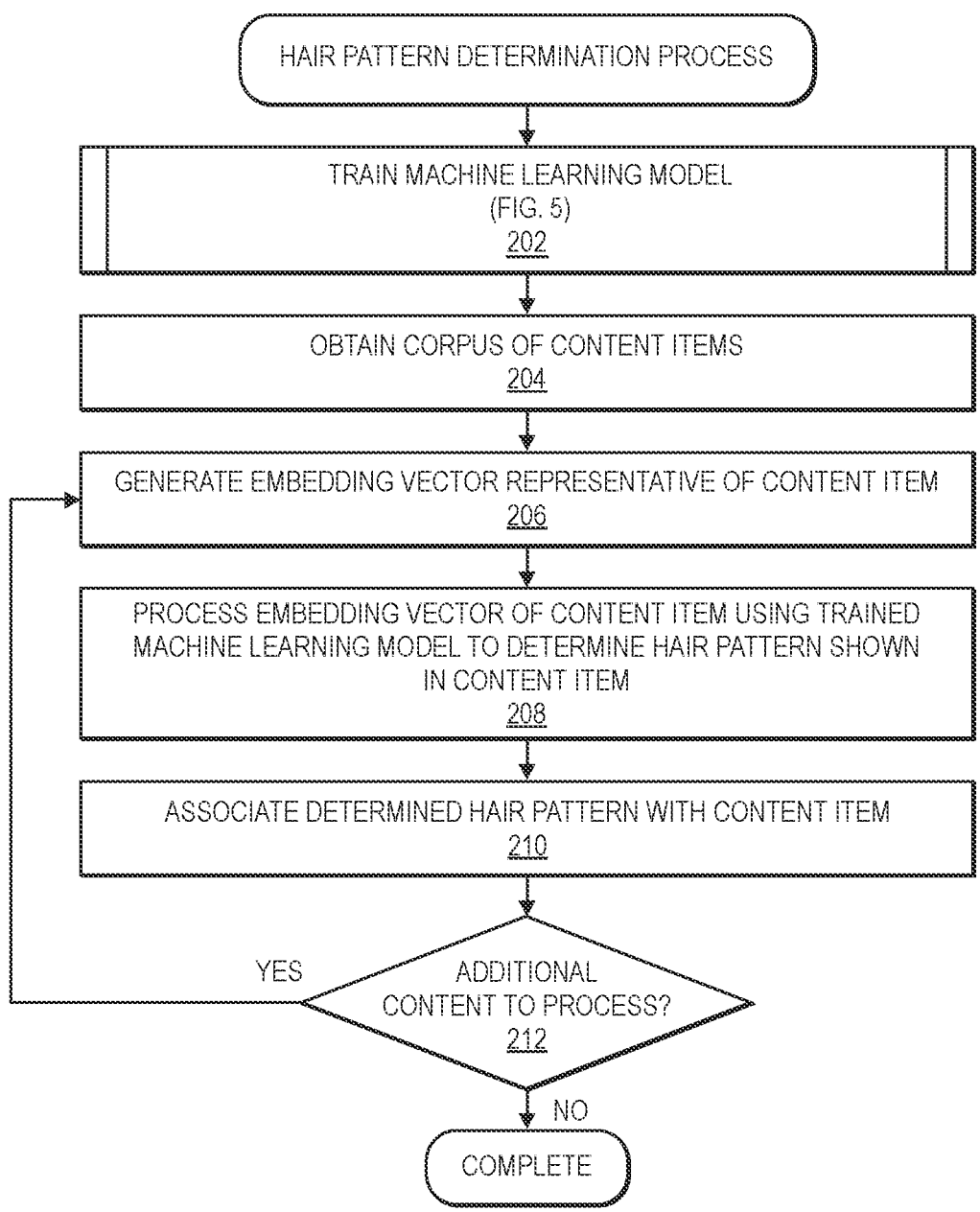
FIG. 2 is a flow diagram of an exemplary hair pattern determination process, according to exemplary embodiments of the present disclosure.

FIG. 2 is a flow diagram of an exemplary hair pattern determination process 200, according to exemplary embodiments of the present disclosure.

As shown in FIG. 2, process 200 may begin at step 202 by training a machine learning model which may be trained to receive an embedding vector associated with a content item and determine one or more hair patterns presented in the content item. According to exemplary embodiments, the trained machine learning model may be configured to classify the hair patterns presented in the content items into various hair pattern types/categories, such as protective, coily, curly, wavy, straight, bald/shaved, and the like. Determination of bald/shaved as a hair pattern can be advantageous over existing systems in that the determination of the lack of hair can provide a more complete and detailed indication of the dataset of content items in connection with the determined hair patterns. Training of the machine learning model is described in further detail herein in connection with FIG. 5.

In step 204, a corpus of content items may be obtained. The content items may include digital images, videos, etc. and may include a visual representation of one or more hair patterns. According to certain implementations, the corpus of content items may have been obtained by filtering a larger corpus of content items to obtain only content items that may include visual representations of one or more people having one or more of the hair pattern types/categories. For example, attributes, parameters, metadata, etc. associated with the content items may be analyzed to discard irrelevant content items that likely do not include visual representations of a hair pattern, so that only content items likely to include a visual representation of one or more hair patterns forms the corpus of content items obtained in step 204.

In step 206, an embedding vector representative of the content item may be generated and associated with the content item. According to aspects of the present disclosure, the embedding vector may be representative of the content item as a whole (e.g., not segments or portions of the content item). As those skilled in the art will appreciate, an "embedding vector" is an array of values that reflect aspects and features of source/input content. For example, an embedding vector representative of a content item may include an array of values describing aspects and features of the content item. A process, referred to as an embedding vector generator, that generates an embedding vector for input content uses the same learned features to identify and extract information, the results of which leads to the generation of the embedding vector. By way of illustration and not limitation, an embedding vector may comprise 128 elements, each element represented by a 32- or 64-bit floating point value, each value representative of some aspect (or multiple aspects) of the input content. In other implementations, the embedding vector may have additional or fewer elements and each element may have additional or fewer floating-point values, integer values, and/or binary values. According to exemplary implementations of the present disclosure, the generated embedding vector may be represented as a binary representation of the embedding vector. For example, the binary representation may be generated using one or more locality-sensitive hashing ("LSH") techniques, such as a random projection method, to generate the binary representation of the embedding vector. According to certain exemplary implementations, the binary implementation can include 512 bits, 1024 bits, 2048 bits, or any other number of bits.

Regarding embedding vector generators, typically an embedding vector generator accepts input content (e.g., an image, video, or multi-item content), processes the input content through various layers of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively the elements of an embedding vector can be used to project or map the corresponding input content into an embedding space as defined by the embedding vectors.

The embedding vector associated with the content item can then be processed by the trained machine learning model to determine one or more hair patterns presented in the content item, as in step 208. Preferably, the embedding vectors associated with each content item are representative of the content item and the DNN is trained so that hair patterns can be determined in the content items without performing and pre-processing (e.g., object detection, background subtraction, image segmentation, or other imaging processing) of the content items prior to determining the hair patterns presented in the content items.

In exemplary implementations, the hair patterns determined for each content item may be classified as one of hair pattern type/category protective, coily, curvy, wavy, straight, and bald/shaved. Alternatively and/or in addition, additional hair pattern types/categories may also be used. Further, where the content item may present more than one hair pattern (e.g., more than one person is presented in the content item with different hair patterns, etc.), the trained machine learning model may determine the most dominant and/or prominent hair pattern presented in the content item (e.g., the hair pattern of the main focus of the content item while ignoring hair patterns shown in the background), and/or may determine all the hair patterns presented in the content item.

After the hair pattern has been determined, the determined hair pattern(s) may be associated with the content item, as in step 210. For example, the determined one or more hair patterns may be associated with the content item as an attribute, a parameter, or other metadata associated with the content item. In exemplary implementations where more than one hair pattern is presented in the content item, only the dominant hair pattern may be associated with the content item. Alternatively and/or in addition, all the determined hair patterns may be associated with the content item. According to certain aspects, a prominence score of the primary hair pattern may be determined, and if the prominence score exceeds a threshold value, only the prominent hair pattern may be associated with the content item, and if the prominence score is below a threshold value, all the determined hair patterns may be associated with the content item.

In step 212, it may be determined if there is another content item in the corpus of content items for processing. If additional content items remain, process 200 returns to step 206 to process the next content item. If no further content items remain, process 200 may complete.

FIGS. 3A-3G are illustrations of exemplary user interfaces, according to exemplary embodiments of the present disclosure.

Figure 3A:
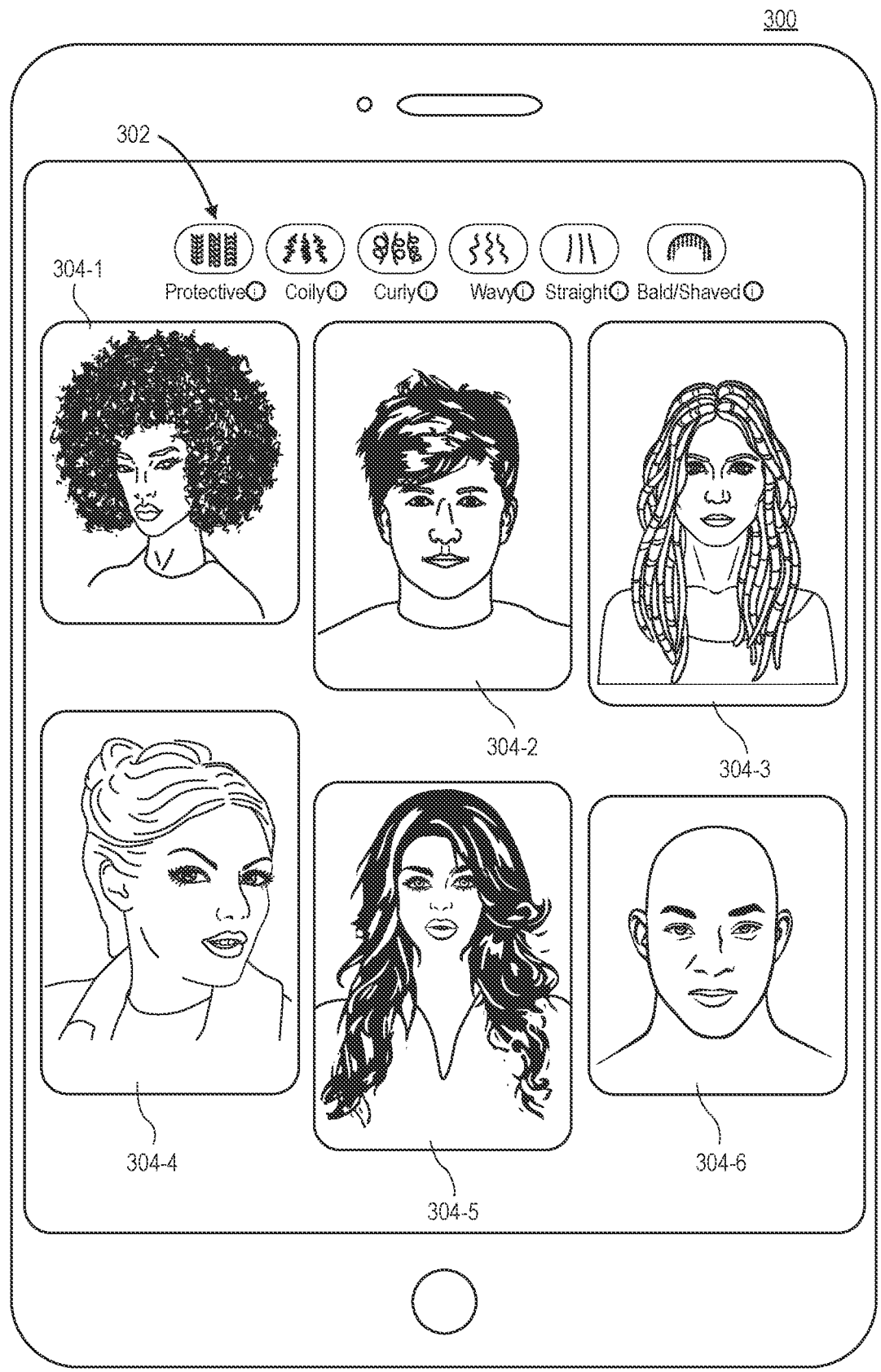
FIGS. 3A-3G are illustrations of exemplary user interfaces, according to exemplary embodiments of the present disclosure.

As shown in FIG. 3A, user interface 300 may present hair pattern filter control 302 and content items 304-1, 304-2, 304-3, 304-4, 304-5, and/or 304-6. In exemplary implementations, user interface 300 may be presented on a display of a client device (e.g., client device 102, 104, and/or 106) in response to a query submitted by a user associated with the client device. For example, user interface 300 may be presented on a display of a client device in response to a query after it has been determined that the query submitted by the user triggers filtering based on hair pattern and that sufficient inventory exists for each of the hair pattern filter options included in hair pattern filter control 302.

Content items 304-1, 304-2, 304-3, 304-4, 304-5, and/or 304-6 may have been identified (e.g., from a corpus of content items such as content items 114) as content items that are responsive to the query, and the query may have been analyzed to determine if the query has relevance to filtering by hair pattern (e.g., queries related to fashion, beauty, hairstyles, makeup, and the like), if the query is sufficiently generic to allow filtering by hair pattern (e.g., the query does not include keywords directed to a specific hair pattern, etc.), and the like. After it has been determined that the query triggers filtering based on hair pattern, an inventory of the responsive content items in each hair pattern category may be determined. For example, in the corpus of responsive content items, the inventory (e.g., the number, a proportional/relative number, etc.) of content items associated with each hair pattern type/category may be determined. The inventory may be analyzed to determine whether sufficient inventory for each hair pattern type/category exists to enable filtering based on hair pattern and presentation of each corresponding hair pattern type/category as an option in hair pattern filter control 302. In the exemplary implementation illustrated in FIG. 3A, it may have been determined that the query triggers filtering based on hair pattern and that sufficient inventory exists for each of the hair pattern type/category options (e.g., protective, coily, curly, wavy, straight, and bald/shaved) so that each hair pattern type/category option is presented in hair pattern filter control 302.

Further, content items 304-1, 304-2, 304-3, 304-4, 304-5, and/or 304-6 may have been selected and arranged in the presentation shown in FIG. 3A to ensure that the user is presented with a diverse set of content items. For example, content items 304-1, 304-2, 304-3, 304-4, 304-5, and/or 304-6, which may have been identified as being relevant and/or responsive to a query, may each include a corresponding ranking (e.g., based on relevance), which may also include a diversification component based on one or more attributes such as, for example, hair pattern, skin tone, gender, age, geographic location, or any other attributes associated with the content items to ensure that a diverse set of content items are presented to the user. The diversification component can be determined using diversification heuristics, a maximal marginal relevance (MMR) approach, a determinantal point processes (DPP), other trained machine learning models and/or probabilistic models, or other algorithms or techniques. Further, the diversification component may be determined in batch. Accordingly, content items 304-1, 304-2, 304-3, 304-4, 304-5, and/or 304-6 may be selected, sorted, arranged, and/or presented based on diversity, in addition to relevance and responsiveness to the query, such that the presented content items are diverse, as well as relevant and responsive to the query.

In the exemplary implementation illustrated in FIG. 3A, hair pattern filter control 302 may include one or more hair pattern type/category options (e.g., protective, coily, curly, wavy, straight, and bald/shaved) based on which the user may choose to filter the responsive content items, and the user may interact with hair pattern filter control 302 to select one or more of the hair pattern type/category options (e.g., protective, coily, curly, wavy, straight, and bald/shaved) to filter the responsive content items to only display the content items associated with the selected hair pattern type/category options. Hair pattern filter control 302 may also include an interactive feature (e.g., shown as an "i" in a circle, etc.) with which a user may interact (e.g., select, hover over, click, etc.) to obtain further information, descriptions, and the like for each hair pattern type/category. Accordingly, in response to a selection of one or more hair pattern type/category options presented by hair pattern filter control 302, content items 304-1, 304-2, 304-3, 304-4, 304-5, and/or 304-6 may be filtered to present only the content items associated with the selected hair pattern type/category option(s). Accordingly, the user may then browse, access, or otherwise consume the curated content items which have been filtered based on the selected hair pattern type/category options.

FIGS. 3B-3G illustrate exemplary user interfaces, according to exemplary embodiments of the present disclosure. Although the exemplary user interfaces shown in FIGS. 3B-3G illustrate implementations where only one hair pattern type/category is selected, according to certain aspects of the present disclosure, more than one hair pattern type/category may be selected and the content items presented may be filtered based on all the selected hair pattern types/categories.

The user interfaces shown in FIGS. 3B-3G may present a hair pattern filter control and one or more content items to the user, and may be presented to the user subsequent to presentation of user interface 300, as shown in FIG. 3A, after the user has made a hair pattern type/category option selection via an interaction with hair pattern filter control 302

Figure 3B:
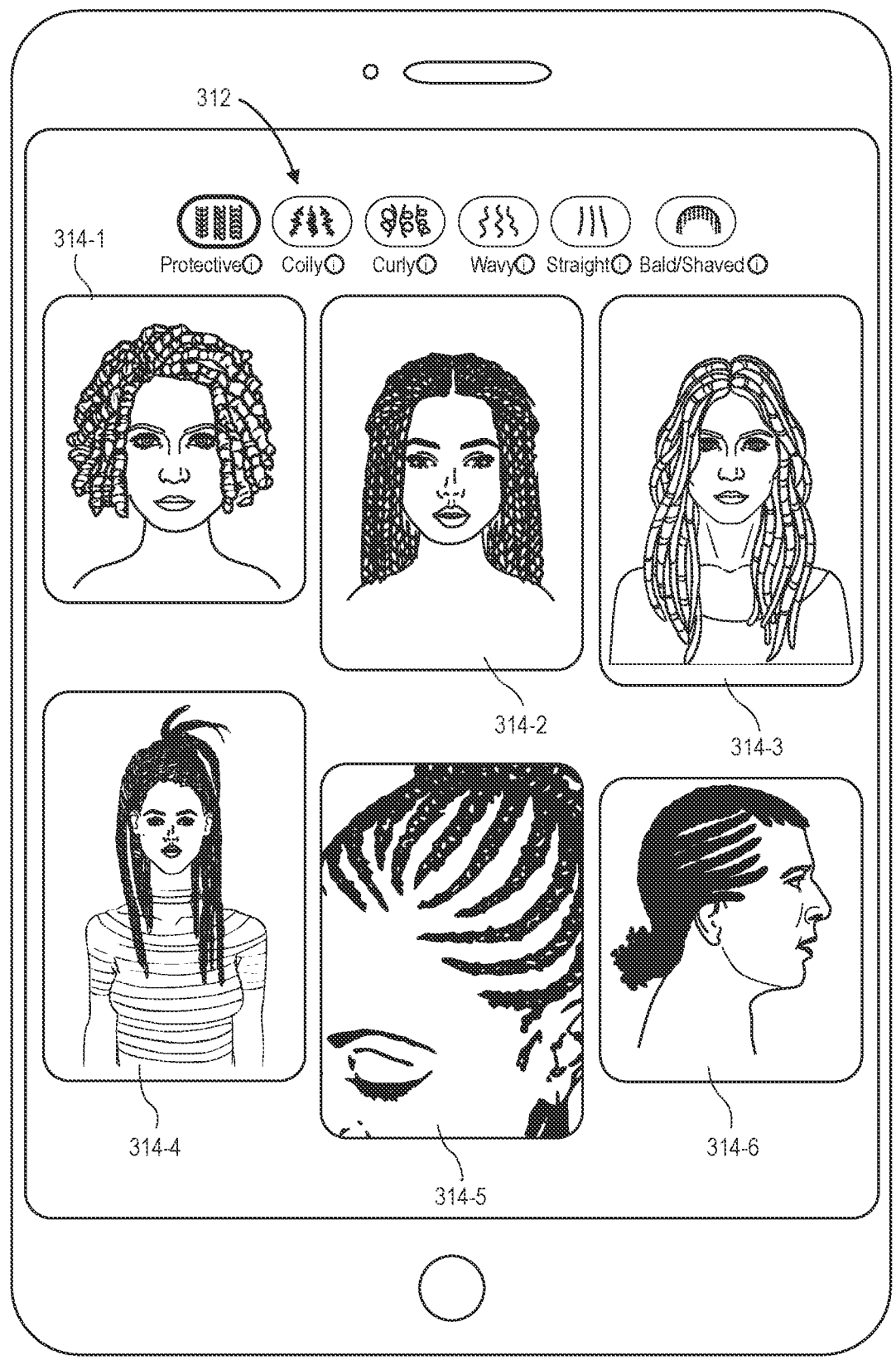

As shown in FIG. 3B, user interface 310 may include hair pattern filter control 312 and content items 314-1, 314-2, 314-3, 314-4, 314-5, and 314-6. User interface 310 illustrated in FIG. 3B may be presented to the user subsequent to presentation of user interface 300 shown in FIG. 3A (or any of FIGS. 3C-3G) after the user has made a hair pattern type/category option selection via an interaction with hair pattern filter control 312.

Figure 3C:
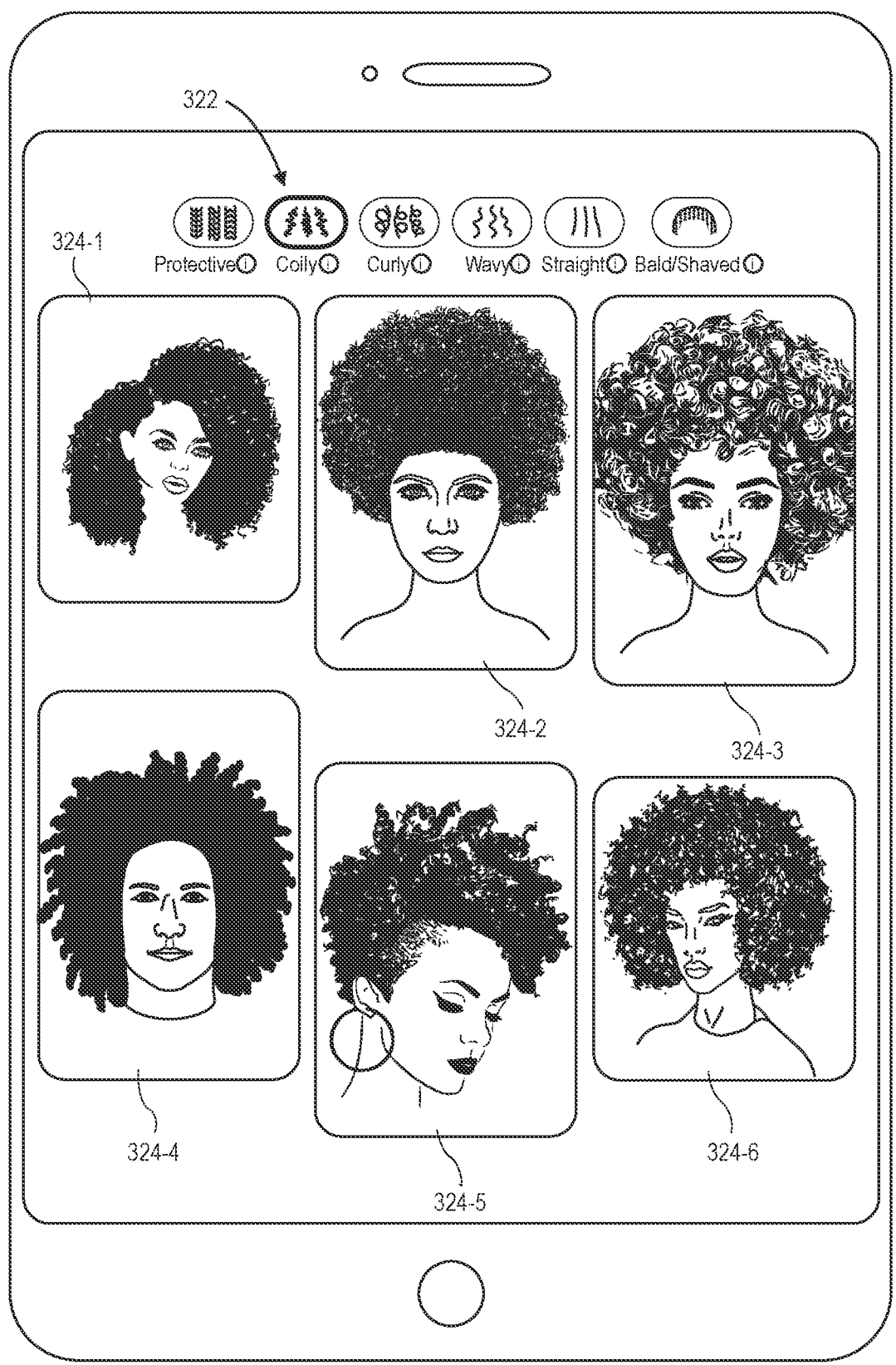

For example, as shown in FIG. 3B, the PROTECTIVE hair pattern type/category option is highlighted in hair pattern filter control 312, indicating that the user has selected the PROTECTIVE hair pattern type/category option via an interaction with hair pattern filter control 312. Accordingly, the content items that were identified as being responsive to the query are filtered by the user's choice of the PROTECTIVE hair pattern type/category option, and only the content items associated with the PROTECTIVE hair pattern type/category may be presented via user interface 310 to the user. Alternatively and/or in addition, in implementations where the responsive content items do not include a sufficient number of content items associated with the PROTECTIVE hair pattern type/category, additional responsive content items associated with the PROTECTIVE hair pattern type/category may also be identified (e.g., from the corpus of content items such as content items 114). Thus, content items 314-1, 314-2, 314-3, 314-4, 314-5, and 314-6, which are presented to the user via user interface 310, may all be associated with the PROTECTIVE hair pattern type/category. Further, the filtered content items, i.e., content items 314-1, 314-2, 314-3, 314-4, 314-5, and 314-6, may have been selected and arranged in the presentation shown in FIG. 3B to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using one or more of diversification heuristics, a maximal marginal relevance (MMR) approach, a determinantal point processes (DPP), other trained machine learning models and/or probabilistic models, or other algorithms or techniques. Accordingly, content items 314-1, 314-2, 314-3, 314-4, 314-5, and 314-6 may be selected, sorted, arranged, and/or presented based on diversity, in addition to filtering, relevance, and/or responsiveness to the query, As shown in FIG. 3C, user interface 320 may include hair pattern filter control 322 and content items 324-1, 324-2, 324-3, 324-4, 324-5, and 324-6. User interface 320 illustrated in FIG. 3C may be presented to the user subsequent to presentation of user interface 300 shown in FIG. 3A (or any of FIGS. 3B or 3D-3G) after the user has made a hair pattern type/category option selection via an interaction with hair pattern filter control 322.

Figure 3D:

For example, as shown in FIG. 3C, the COILY hair pattern type/category option is highlighted in hair pattern filter control 322, indicating that the user has selected the COILY hair pattern type/category option via an interaction with hair pattern filter control 322. Accordingly, the content items that were identified as being responsive to the query are filtered by the user's choice of the COILY hair pattern type/category option, and only the content items associated with the COILY hair pattern type/category may be presented via user interface 320 to the user. Alternatively and/or in addition, in implementations where the responsive content items do not include a sufficient number of content items associated with the COILY hair pattern type/category, additional responsive content items associated with the COILY hair pattern type/category may also be identified (e.g., from the corpus of content items such as content items 114). Thus, content items 324-1, 324-2, 324-3, 324-4, 324-5, and 324-6, which are presented to the user via user interface 320, may all be associated with the COILY hair pattern type/category. Further, the filtered content items, i.e., content items 324-1, 324-2, 324-3, 324-4, 324-5, and 324-6, may have been selected and arranged in the presentation shown in FIG. 3C to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 324-1, 324-2, 324-3, 324-4, 324-5, and 324-6 may be selected, sorted, arranged, and/or presented based on diversity, in addition to filtering, relevance, and/or responsiveness to the query, As shown in FIG. 3D, user interface 330 may include hair pattern filter control 332 and content items 334-1, 334-2, 334-3, 334-4, 334-5, and 334-6. User interface 330 illustrated in FIG. 3D may be presented to the user subsequent to presentation of user interface 300 shown in FIG. 3A (or any of FIGS. 3B, 3C, or 3E-3G) after the user has made a hair pattern type/category option selection via an interaction with hair pattern filter control 332.

Figure 3E:
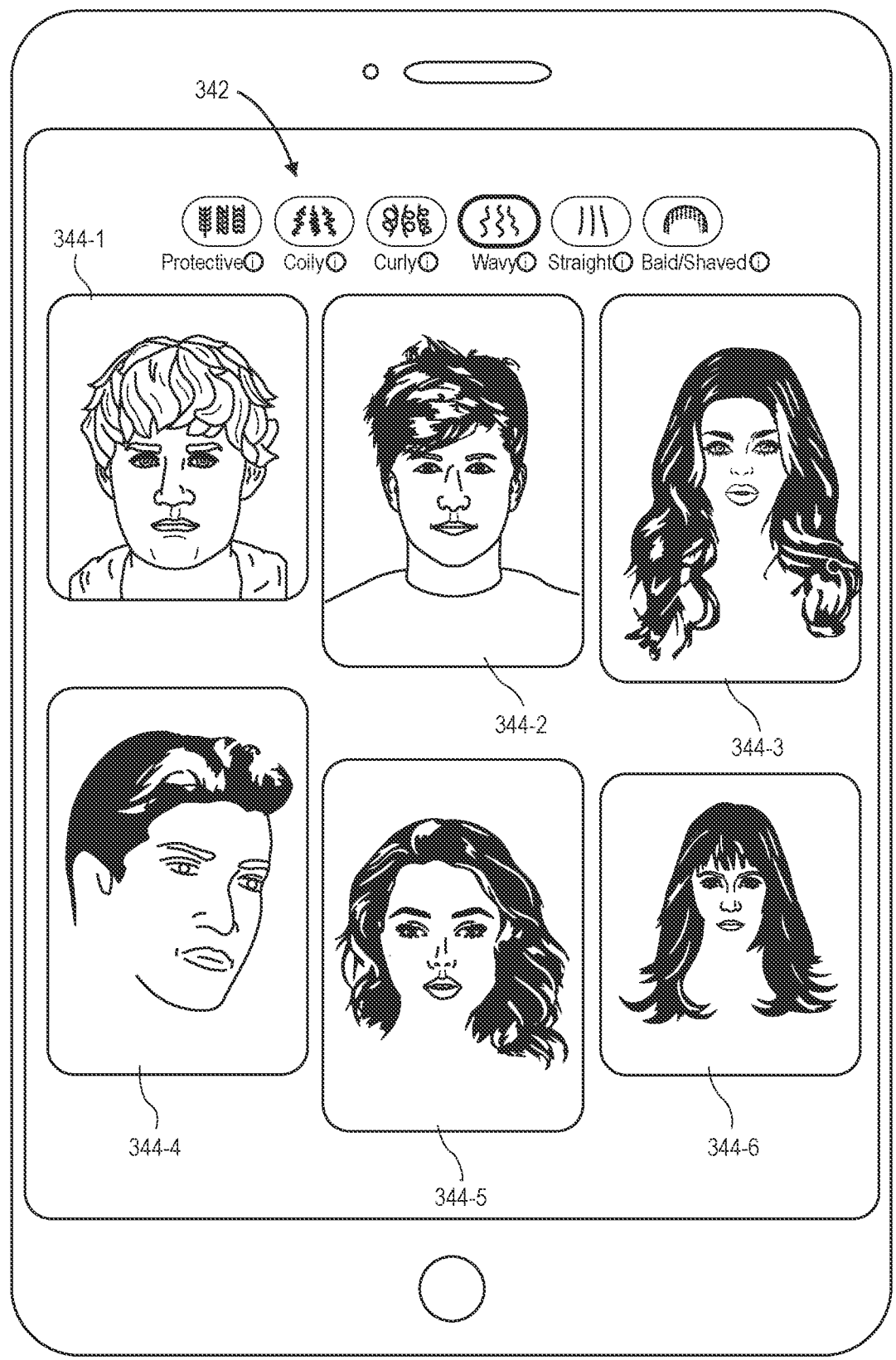

For example, as shown in FIG. 3D, the CURLY hair pattern type/category option is highlighted in hair pattern filter control 332, indicating that the user has selected the CURLY hair pattern type/category option via an interaction with hair pattern filter control 332. Accordingly, the content items that were identified as being responsive to the query are filtered by the user's choice of the CURLY hair pattern type/category option, and only the content items associated with the CURLY hair pattern type/category may be presented via user interface 330 to the user. Alternatively and/or in addition, in implementations where the responsive content items do not include a sufficient number of content items associated with the CURLY hair pattern type/category, additional responsive content items associated with the CURLY hair pattern type/category may also be identified (e.g., from the corpus of content items such as content items 114). Thus, content items 334-1, 334-2, 334-3, 334-4, 334-5, and 334-6, which are presented to the user via user interface 330, may all be associated with the CURLY hair pattern type/category. Further, the filtered content items, i.e., content items 334-1, 334-2, 334-3, 334-4, 334-5, and 334-6, may have been selected and arranged in the presentation shown in FIG. 3D to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 334-1, 334-2, 334-3, 334-4, 334-5, and 334-6 may be selected, sorted, arranged, and/or presented based on diversity, in addition to filtering, relevance, and/or responsiveness to the query, As shown in FIG. 3E, user interface 340 may include hair pattern filter control 342 and content items 344-1, 344-2, 344-3, 344-4, 344-5, and 344-6. User interface 340 illustrated in FIG. 3E may be presented to the user subsequent to presentation of user interface 300 shown in FIG. 3A (or any of FIGS. 3B-3D, 3F, or 3G) after the user has made a hair pattern type/category option selection via an interaction with hair pattern filter control 342.

Figure 3F:
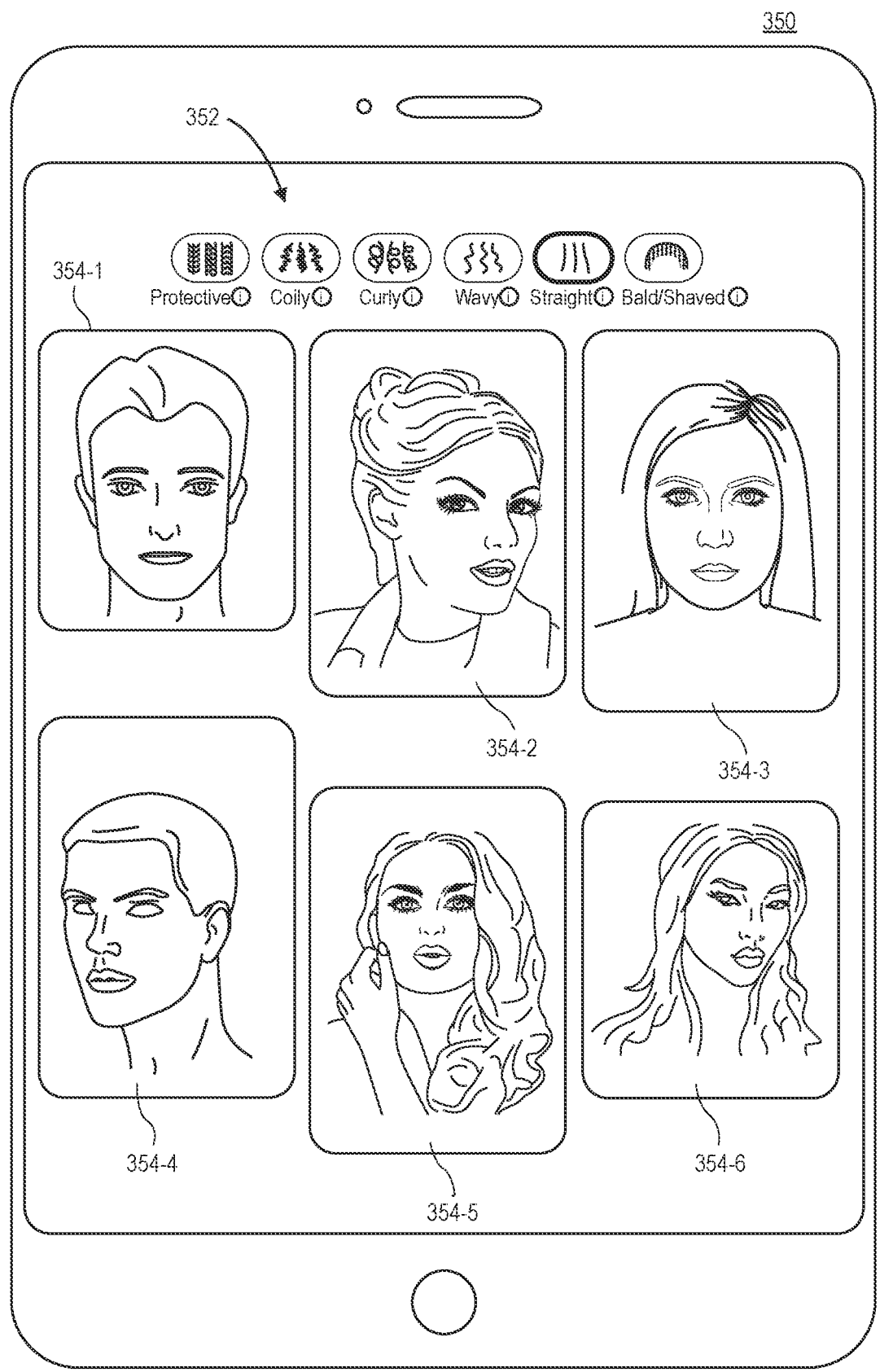

For example, as shown in FIG. 3E, the WAVY hair pattern type/category option is highlighted in hair pattern filter control 342, indicating that the user has selected the WAVY hair pattern type/category option via an interaction with hair pattern filter control 342. Accordingly, the content items that were identified as being responsive to the query are filtered by the user's choice of the WAVY hair pattern type/category option, and only the content items associated with the WAVY hair pattern type/category may be presented via user interface 340 to the user. Alternatively and/or in addition, in implementations where the responsive content items do not include a sufficient number of content items associated with the WAVY hair pattern type/category, additional responsive content items associated with the WAVY hair pattern type/category may also be identified (e.g., from the corpus of content items such as content items 114). Thus, content items 344-1, 344-2, 344-3, 344-4, 344-5, and 344-6, which are presented to the user via user interface 340, may all be associated with the WAVY hair pattern type/category. Further, the filtered content items, i.e., content items 344-1, 344-2, 344-3, 344-4, 344-5, and 344-6, may have been selected and arranged in the presentation shown in FIG. 3E to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 344-1, 344-2, 344-3, 344-4, 344-5, and 344-6 may be selected, sorted, arranged, and/or presented based on diversity, in addition to filtering, relevance, and/or responsiveness to the query, As shown in FIG. 3F, user interface 350 may include hair pattern filter control 352 and content items 354-1, 354-2, 354-3, 354-4, 354-5, and 354-6. User interface 350 illustrated in FIG. 3F may be presented to the user subsequent to presentation of user interface 300 shown in FIG. 3A (or any of FIGS. 3B-3E or 3G) after the user has made a hair pattern type/category option selection via an interaction with hair pattern filter control 352.

Figure 3G:
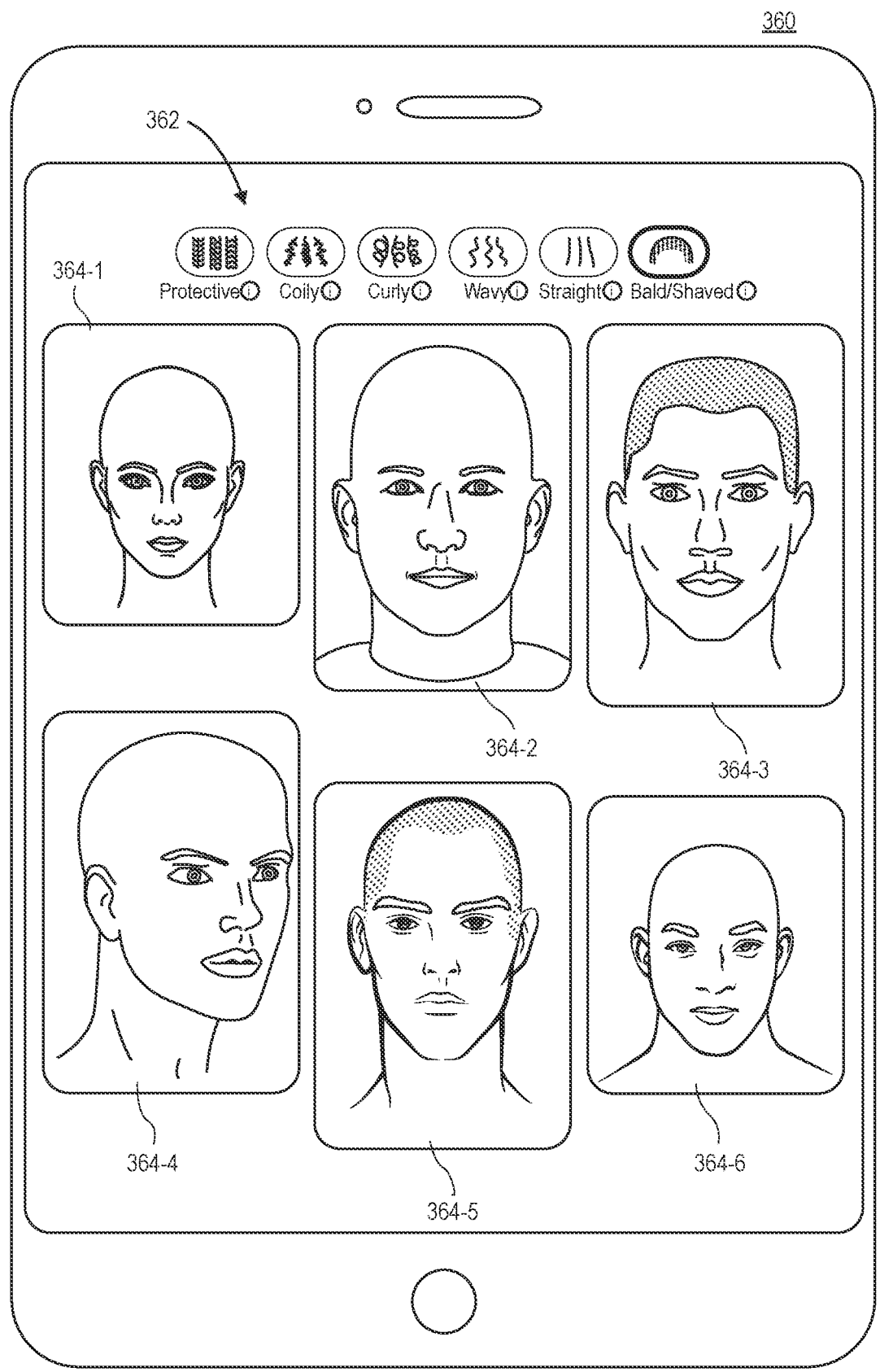

For example, as shown in FIG. 3F, the STRAIGHT hair pattern type/category option is highlighted in hair pattern filter control 352, indicating that the user has selected the STRAIGHT hair pattern type/category option via an interaction with hair pattern filter control 352. Accordingly, the content items that were identified as being responsive to the query are filtered by the user's choice of the STRAIGHT hair pattern type/category option, and only the content items associated with the STRAIGHT hair pattern type/category may be presented via user interface 350 to the user. Alternatively and/or in addition, in implementations where the responsive content items do not include a sufficient number of content items associated with the STRAIGHT hair pattern type/category, additional responsive content items associated with the STRAIGHT hair pattern type/category may also be identified (e.g., from the corpus of content items such as content items 114). Thus, content items 354-1, 354-2, 354-3, 354-4, 354-5, and 354-6, which are presented to the user via user interface 350, may all be associated with the STRAIGHT hair pattern type/category. Further, the filtered content items, i.e., content items 354-1, 354-2, 354-3, 354-4, 354-5, and 354-6, may have been selected and arranged in the presentation shown in FIG. 3F to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 354-1, 354-2, 354-3, 354-4, 354-5, and 354-6 may be selected, sorted, arranged, and/or presented based on diversity, in addition to filtering, relevance, and/or responsiveness to the query, As shown in FIG. 3G, user interface 360 may include hair pattern filter control 362 and content items 364-1, 364-2, 364-3, 364-4, 364-5, and 364-6. User interface 360 illustrated in FIG. 3G may be presented to the user subsequent to presentation of user interface 300 shown in FIG. 3A (or any of FIGS. 3B-3F) after the user has made a hair pattern type/category option selection via an interaction with hair pattern filter control 362.

For example, as shown in FIG. 3G, the BALD/SHAVED hair pattern type/category option is highlighted in hair pattern filter control 362, indicating that the user has selected the BALD/SHAVED hair pattern type/category option via an interaction with hair pattern filter control 362. Accordingly, the content items that were identified as being responsive to the query are filtered by the user's choice of the BALD/SHAVED hair pattern type/category option, and only the content items associated with the BALD/SHAVED hair pattern type/category may be presented via user interface 360 to the user. Alternatively and/or in addition, in implementations where the responsive content items do not include a sufficient number of content items associated with the BALD/SHAVED hair pattern type/category, additional responsive content items associated with the BALD/SHAVED hair pattern type/category may also be identified (e.g., from the corpus of content items such as content items 114). Thus, content items 364-1, 364-2, 364-3, 364-4, 364-5, and 364-6, which are presented to the user via user interface 360, may all be associated with the BALD/SHAVED hair pattern type/category. Further, the filtered content items, i.e., content items 364-1, 364-2, 364-3, 364-4, 364-5, and 364-6, may have been selected and arranged in the presentation shown in FIG. 3G to ensure that the user is presented with a diverse set of content items based on one or more attributes such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 364-1, 364-2, 364-3, 364-4, 364-5, and 364-6 may be selected, sorted, arranged, and/or presented based on diversity, in addition to filtering, relevance, and/or responsiveness to the query, FIG. 4A is a flow diagram of an exemplary filtering process, according to exemplary embodiments of the present disclosure.

Figure 4A:
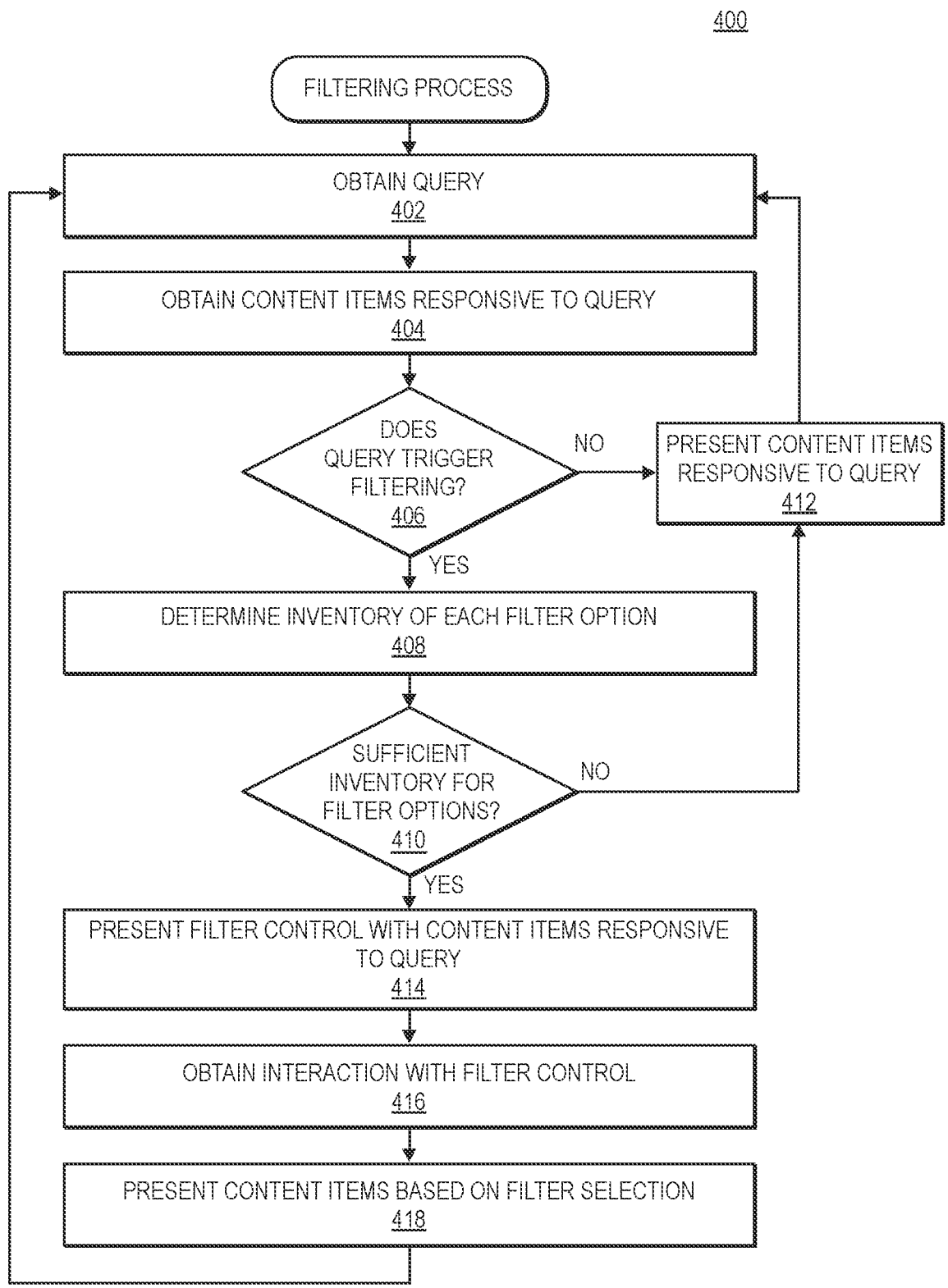
FIG. 4A is a flow diagram of an exemplary filtering process, according to exemplary embodiments of the present disclosure.

As shown in FIG. 4A, process 400 may begin at step 402, where a query may be obtained from a user. For example, a user may submit a query via a client device (e.g., client devices 102, 104, and/or 106) in connection with a search for content items. In step 404, content items responsive to the query may be obtained. For example, an online service (e.g., online service 110) may identify content items from a corpus of content items (e.g., content items 114) that may be responsive and/or relevant to the query. The relevant content items may be identified, for example, based on embedding vectors, attributes, metadata, etc. associated with the content items and the query, and may utilize various clustering algorithms, similarity metrics, and the like. According to certain aspects of the present disclosure, the identified content items may be ranked according to relevance to the query.

Additionally, the query may be processed to determine whether the submitted query may trigger filtering of the identified content items based on hair pattern, as in step. 406. For example, the query may be analyzed to determine if the query has relevance to filtering by hair pattern (e.g., queries related to fashion, beauty, hairstyles, makeup, and the like), if the query is sufficiently generic to allow filtering by hair pattern (e.g., the query does not include keywords directed to a specific hair pattern, etc.), and the like.

In the event that it is determined that the query does not trigger filtering based on hair pattern, the content items identified in step 404 as being relevant and/or responsive to the query may be presented to the user, as in step 412. Accordingly, a query unrelated to hair patterns and/or likely to identify responsive content items that do not include representations of hair patterns may not trigger filtering based on hair pattern.

If it has been determined that the query triggers filtering based on hair pattern, an inventory of the responsive content items in each hair pattern type/category may be determined, as in step 408. For example, the number of content items in the responsive content items identified in step 404 that are associated with each hair pattern type/category may be determined. This can include an absolute number, a relative number (e.g., to the inventory of each hair pattern type/category), a proportional number (e.g., relative to the total number of responsive content items identified in step 404), etc. The inventory for each hair pattern category may be used to determine whether to enable filtering based on hair pattern and/or the hair pattern categories that may be made available for filtering. For example, if the determined inventory indicates that the responsive content items only include a single type of hair pattern type/category (e.g., one of protective, coily, curly, wavy, straight, or bald/shaved), filtering based on hair pattern may not be made available since only one type of hair pattern is included in the responsive content items. In such a scenario, the content items identified in step 404 as being relevant and/or responsive to the query may be presented to the user, as in step 412.

In the event that sufficient inventory exists for at least two hair pattern types/categories, as in step 410, filtering based on hair pattern may be enabled and made available for hair pattern categories for which sufficient inventory exists. For example, if it is determined that sufficient inventory exists for protective, coily, and wavy, filtering based on protective, coily, wavy made be made available, while filtering based on curvy, straight, and bald/shaved may not be made available. According to exemplary implementations, the determined inventory for each hair pattern type and/or category may be compared against a threshold to determine whether sufficient inventory exists for each hair pattern type/category. The threshold value may include a predetermined value, a ratio or relative value based on the total number of responsive content items and/or the inventory for each hair pattern type/category, and the like.

After it has been determined that sufficient inventory exists to enable filtering based on at least two of the hair pattern types/categories, in step 414, a filter control may be presented, via a user interface, with the responsive content items presented to the user. According to exemplary implementations of the present disclosure, the content items presented to the user may be selected to ensure presentation of a diverse set of content items based on one or more attributes associated with the content items. For example, the ranking of the responsive content items identified in step 404 also include a diversification component based on one or more attributes such as, for example, hair pattern, skin tone, gender, age, geographic location, or any other attributes associated with the content items to ensure that a diverse set of content items are presented to the user. The diversification component can be determined using diversification heuristics, a maximal marginal relevance (MMR) approach, a determinantal point processes (DPP), other trained machine learning models and/or probabilistic models, or other algorithms or techniques. Further, the diversification component may be determined in batch. Accordingly, the identified content items may be sorted and selected based on diversity, in addition to relevance and responsiveness to the query, and the presented to the user such that the presented content items are diverse, as well as relevant and responsive to the query.

In step 416, an interaction with the filter control may be received, indicating a selection of one or more hair pattern types/categories. For example, the user may have selected one or more of hair pattern types/categories protective, coily, curly, wavy, straight, and/or shaved/bald. In response, the presented content items may be filtered based on the hair pattern type/category selected by the user such that only the content items associated with the selected hair patterns may be presented, as in step 418. In an exemplary implementation where the user interacted with the hair pattern filter control to select the coily hair pattern type/category, only the content items associated with the coily hair pattern type/category may be presented to the user. Similarly, in an exemplary implementation where the user has selected the wavy and straight hair pattern types/categories via an interaction with the hair pattern filter control, only the content items associated with the wavy and straight hair pattern types/categories may be presented to the user. Additionally, the filtered content items presented to the user based on the selected hair pattern type/category may be presented based at least in part on a diversity ranking associated with the filtered content items to ensure that the filtered content items presented to the user also include a diverse set of content items. Process 400 may be repeated for each received query.

Figure 4B:
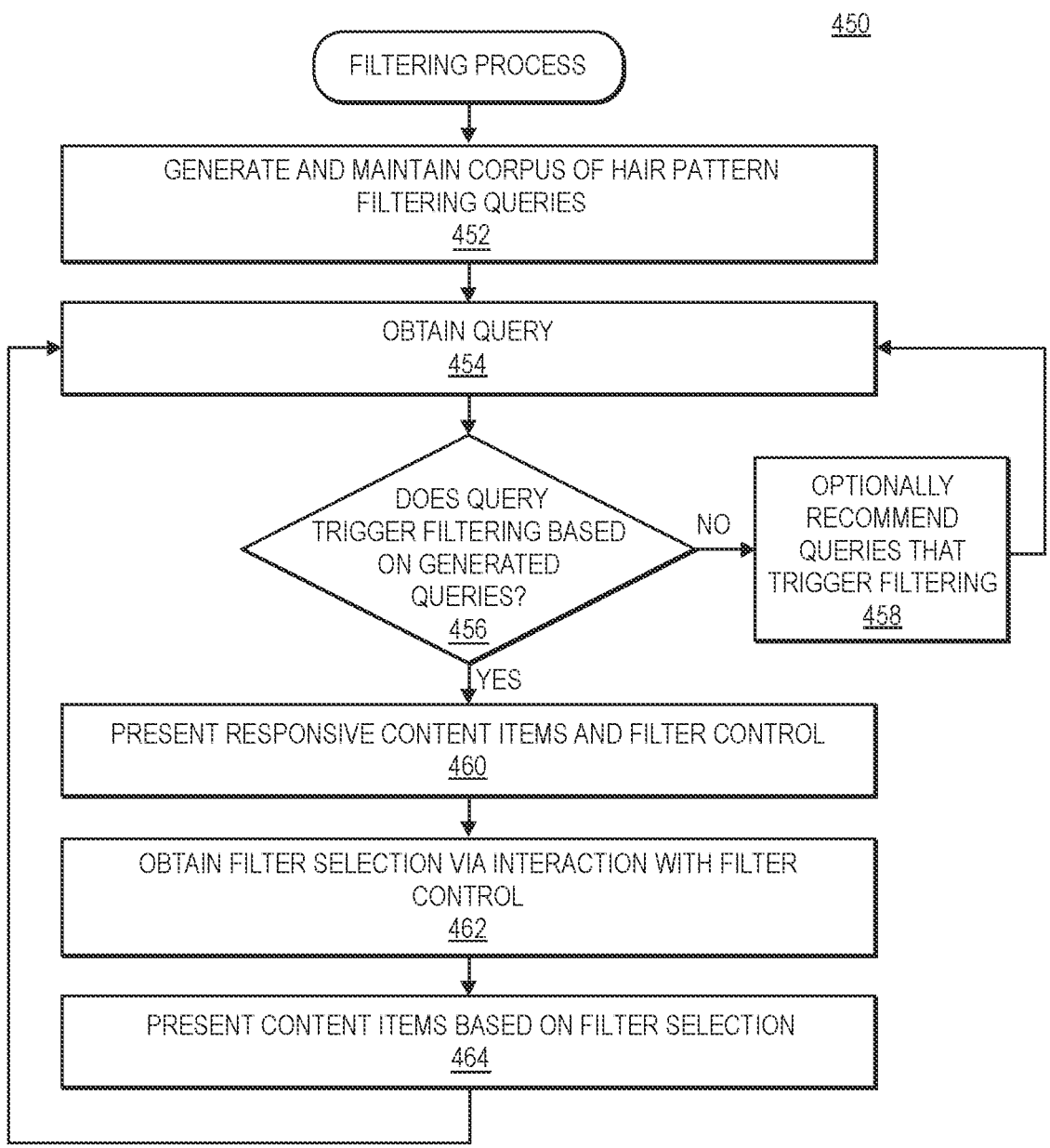
FIG. 4B is a flow diagram of an exemplary filtering process, according to exemplary embodiments of the present disclosure.

FIG. 4B is a flow diagram of an exemplary filtering process, according to exemplary embodiments of the present disclosure.

As shown in FIG. 4B, process 450 may begin at step 452, where a corpus of hair pattern filtering queries may be generated and maintained. For example, queries may be processed to identify queries that have relevance to filtering by hair pattern (e.g., queries related to fashion, beauty, hairstyles, makeup, and the like), are sufficiently generic to allow filtering by hair pattern (e.g., the query does not include keywords directed to a specific hair pattern, etc.), and include sufficient inventory of responsive content items associated with at least one of the hair pattern categories so as to facilitate filtering based on hair pattern. According to certain aspects of the present disclosure, determination of whether a query triggers filtering by hair pattern may be different based on geography, location, etc. Accordingly, the identified queries may be used to generate, store, and maintain a corpus of queries that may trigger filtering based on hair pattern, which may be periodically updated (e.g., as additional content items become available, etc.). Alternatively, if it is determined that a certain query is not relevant to filtering based on hair pattern and/or does not include sufficient inventory for one or more of the hair pattern categories, then it may be determined that the query in question does not trigger filtering based on hair pattern and may be excluded from the corpus of queries.

In step 454, a query may be obtained from a user. For example, a user may submit a query via a client device (e.g., client devices 102, 104, and/or 106) in connection with a search for content items. The query may be processed, in step 456, to determine whether the submitted query may trigger filtering of the identified content items based on hair pattern. For example, the received query may be processed to determine whether the received query is included in the corpus of triggering queries. If the received query is included in the corpus of triggering queries, filtering based on hair pattern may be triggered, whereas if the received query is not included in the corpus of triggering queries, filtering based on hair pattern may not be triggered. If it is determined that the received query is not included in the corpus of triggering queries such that filtering based on hair pattern is not triggered, one or more recommended queries (e.g., as an autocomplete suggestion, etc.) from the corpus of triggering queries that may trigger filtering based on hair pattern may be optionally recommended and presented, as in step 458.

In step 460, content items relevant and/or responsive to the query may be identified and presented to the user, along with a filter control. According to exemplary implementations of the present disclosure, the content items presented to the user may be selected to ensure presentation of a diverse set of content items based on one or more attributes associated with the content items.

In step 462, an interaction with the filter control may be received indicating a selection of one or more hair pattern types/categories. For example, the user may have selected one or more of hair pattern types/categories protective, coily, curly, wavy, straight, and/or shaved/bald. In response, the presented content items may be filtered based on the hair pattern type/category selected by the user such that only the content items associated with the selected hair patterns may be presented, as in step 464. In an exemplary implementation where the user interacted with the hair pattern filter control to select the coily hair pattern type/category, only the content items associated with the coily hair pattern type/category may be presented to the user. Similarly, in an exemplary implementation where the user has selected the wavy and straight hair pattern types/categories via an interaction with the hair pattern filter control, only the content items associated with the wavy and straight hair pattern types/categories may be presented to the user. Additionally, the filtered content items presented to the user based on the selected hair pattern type/category may be presented based at least in part on a diversity ranking associated with the filtered content items to ensure that the filtered content items presented to the user also include a diverse set of content items. Process 450 may then return to step 454 to process a further query.

Figure 5:
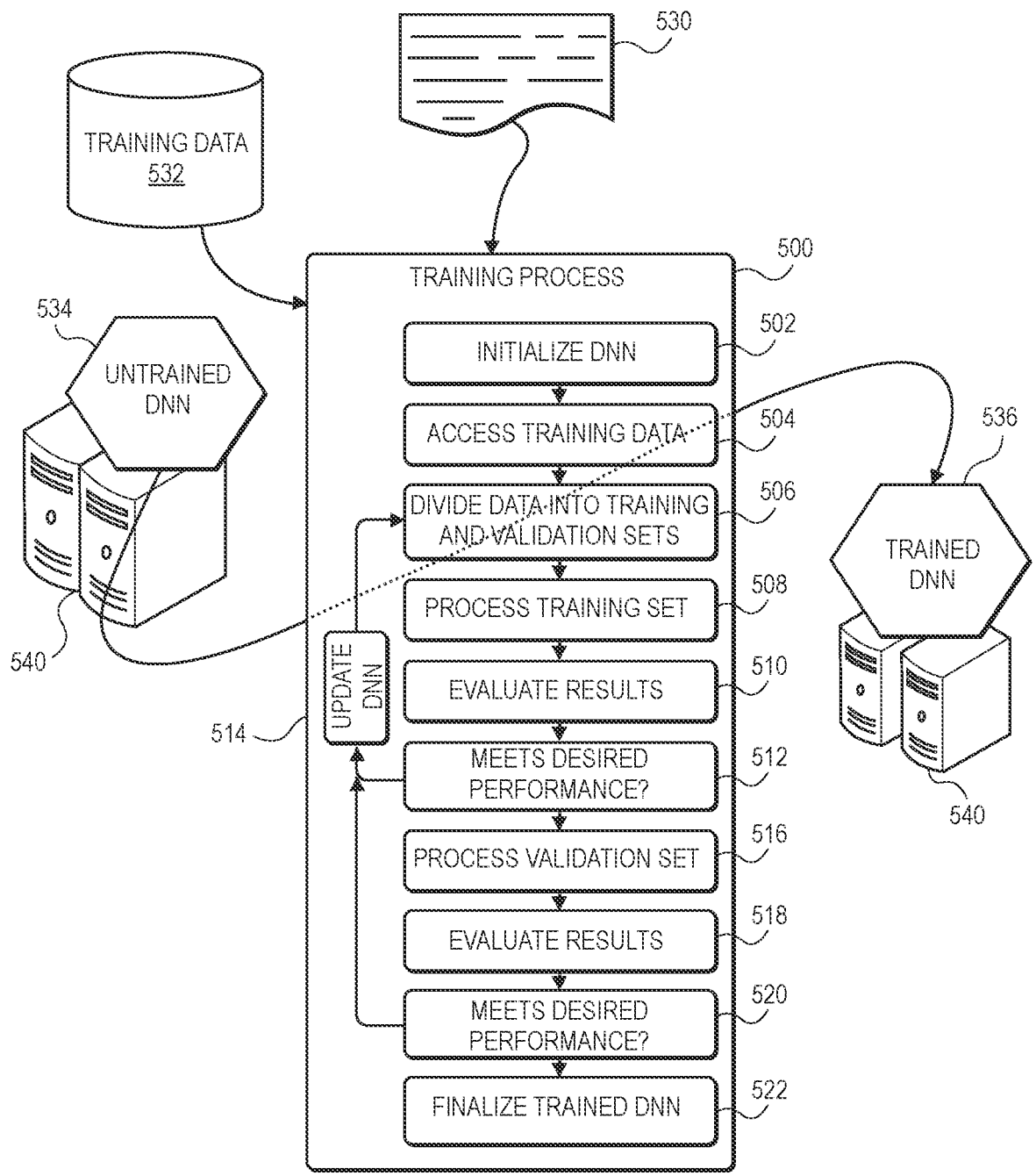
FIG. 5 is a flow diagram of an exemplary deep neural network training process, according to exemplary embodiments of the present disclosure.

FIG. 5 is a flow diagram of an exemplary training process 500 for training a DNN (or other machine learning model), according to exemplary embodiments of the present disclosure.

As shown in FIG. 5, training process 500 is configured to train an untrained DNN 534 operating on computer system 540 to transform untrained DNN 534 into trained DNN 536 that operates on the same or another computer system, such as online service 110. In the course of training, as shown in FIG. 5, at step 502, untrained DNN 534 is initialized with training criteria 530. Training criteria 530 may include, but is not limited to, information as to a type of training, number of layers to be trained, candidate labels, etc.

At step 504 of training process 500, corpus of labeled training data 532, may be accessed. For example, if training is to generate a trained DNN that predicts hair pattern types/categories, labeled training data 532 may include labeled content items presenting the various hair pattern types/categories, and the like. According to certain aspects of the present disclosure, labeled training data 532 may include content items that are labeled by multiple sources and an aggregation of the multiple labels (e.g., mean, median, mode, etc.) may be used as the label for each item of labeled training data 532.

The disclosed implementations discuss the use of labeled training data, meaning that the actual results of processing of the data items of the corpus of training data (i.e., whether the data corresponds to a positive or negative presence of a condition) are known. Of course, in various implementations, the training data 532 may also or alternatively include unlabeled training data.

With training data 532 accessed, at step 506, training data 532 is divided into training and validation sets. Generally speaking, the items of data in the training set are used to train untrained DNN 534 and the items of data in the validation set are used to validate the training of the DNN. As those skilled in the art will appreciate, and as described below in regard to much of the remainder of training process 500, there are numerous iterations of training and validation that occur during the training of the DNN.

At step 508 of training process 500, the data items of the training set are processed, often in an iterative manner. Processing the data items of the training set includes capturing the processed results. After processing the items of the training set, at step 510, the aggregated results of processing the training set are evaluated, and at step 512, a determination is made as to whether a desired performance has been achieved. If the desired performance is not achieved, in step 514, aspects of the machine learning model are updated in an effort to guide the machine learning model to generate more accurate results, and processing returns to step 506, where a new set of training data is selected, and the process repeats. Alternatively, if the desired performance is achieved, training process 500 advances to step 516.

At step 516, and much like step 508, the data items of the validation set are processed, and at step 518, the processing performance of this validation set is aggregated and evaluated. At step 520, a determination is made as to whether a desired performance, in processing the validation set, has been achieved. If the desired performance is not achieved, in step 514, aspects of the machine learning model are updated in an effort to guide the machine learning model to generate more accurate results, and processing returns to step 506. Alternatively, if the desired performance is achieved, the training process 500 advances to step 522.

At step 522, a finalized, trained DNN 536 is generated for determining hair pattern types/categories. Typically, though not exclusively, as part of finalizing the now-trained DNN 536, portions of the DNN that are included in the model during training for training purposes are extracted, thereby generating a more efficient trained DNN 536.

Figure 6:
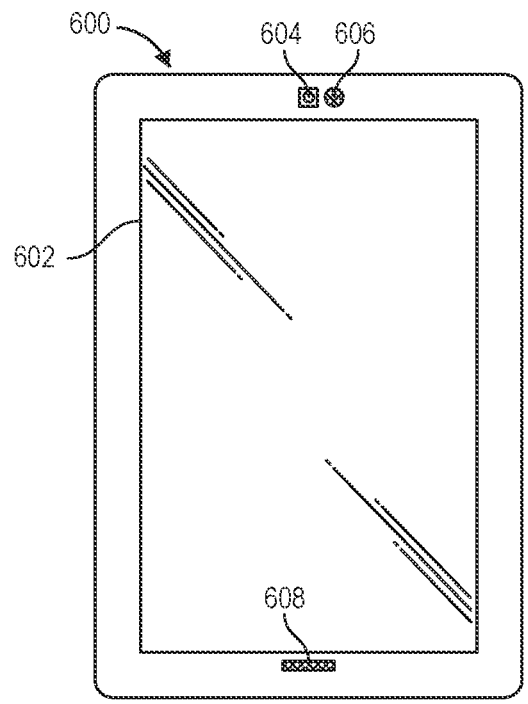
FIG. 6 is an illustration of an exemplary client device, according to exemplary embodiments of the present disclosure.

FIG. 6 illustrates an exemplary client device 600 that can be used in accordance with various implementations described herein. In this example, client device 600 includes display 602 and optionally, at least one input component 604, such as a camera, on a same side and/or opposite side of the device as display 602. Client device 600 may also include an audio transducer, such as speaker 606, and microphone 608. Generally, client device 600 may have any form of input/output components that allow a user to interact with client device 600. For example, the various input components for enabling user interaction with the device may include touch-based display 602 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a user device or otherwise in communication with the user device. Various other input components and combinations of input components can be used as well within the scope of the various implementations, as should be apparent in light of the teachings and suggestions contained herein.

Figure 7:
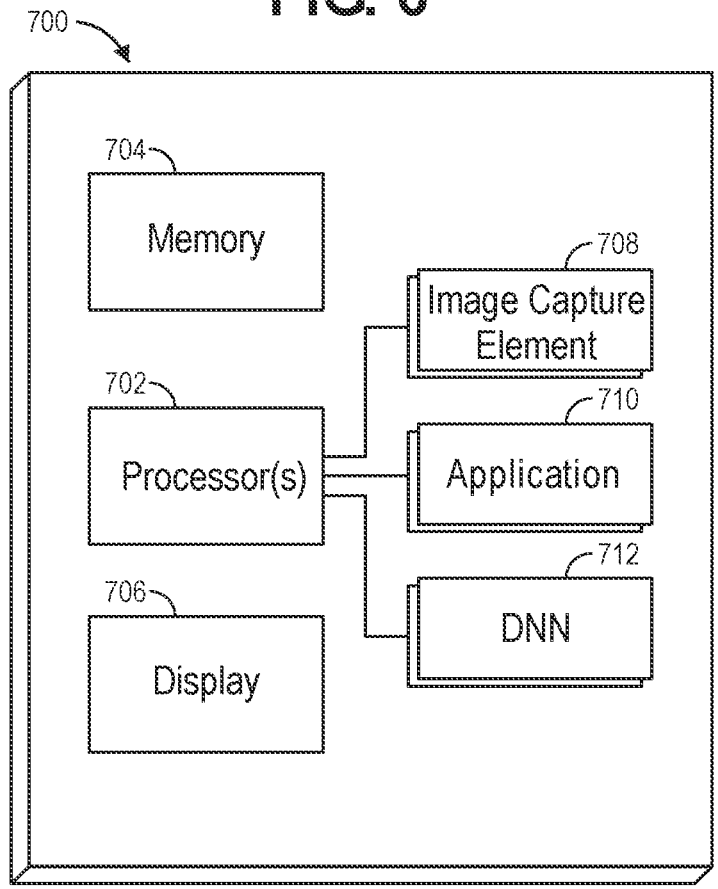
FIG. 7 is an illustration of an exemplary configuration of a client device, such as that illustrated in FIG. 6, according to exemplary embodiments of the present disclosure.

In order to provide the various functionality described herein, FIG. 7 illustrates an exemplary configuration 700 of a client device, such as client device 600 described with respect to FIG. 6 and discussed herein. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the one or more processors 702. Removable storage memory can be available for sharing information with other devices, etc. The device typically will include some type of display 706, such as a touch-based display, electronic ink (e-ink), organic light emitting diode (OLED), liquid crystal display (LCD), etc.

As discussed, the device in many implementations will include at least one image capture element 708, such as one or more cameras that are able to capture image objects in the vicinity of the device. An image capture element can include, or be based at least in part upon, any appropriate technology, such as a CCD or CMOS image capture element having a determined resolution, focal range, viewable area, and capture rate. The device can include at least one application component 710 for performing the implementations discussed herein. Optionally, the device can include trained DNN 712, which can be configured to determine hair pattern types/categories according to the implementations described herein. The user device may be in constant or intermittent communication with one or more remote computing resources and may exchange information, such as livestream feeds, chat messages, etc., with the remote computing system(s) as part of the disclosed implementations.

The device also can include at least one location component, such as GPS, NFC location tracking, Wi-Fi location monitoring, etc. The example client device may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 8:
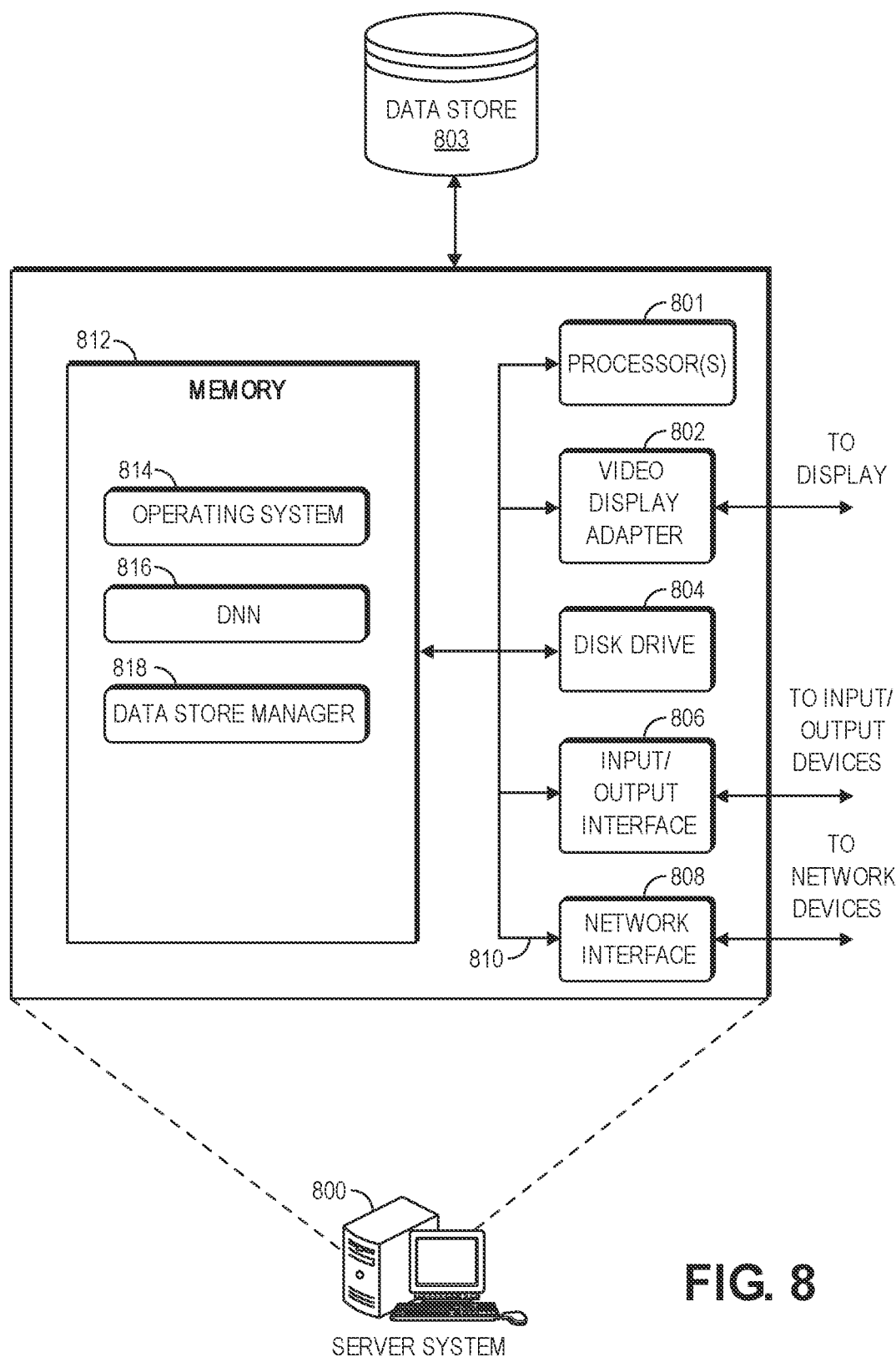
FIG. 8 is an illustration of an exemplary server system, according to exemplary embodiments of the present disclosure.

FIG. 8 is a pictorial diagram of an illustrative implementation of a server system 800 that may be used with one or more of the implementations described herein. Server system 800 may include one or more processors 801, such as one or more redundant processors, video display adapter 802, disk drive 804, input/output interface 806, network interface 808, and memory 812. Processor(s) 801, video display adapter 802, disk drive 804, input/output interface 806, network interface 808, and memory 812 may be communicatively coupled to each other by communication bus 810.

Video display adapter 802 provides display signals to a local display permitting an operator of server system 800 to monitor and configure operation of server system 800. Input/output interface 806 likewise communicates with external input/output devices not shown in FIG. 8, such as a mouse, keyboard, scanner, or other input and output devices that can be operated by an operator of server system 800. Network interface 808 includes hardware, software, or any combination thereof, to communicate with other computing devices. For example, network interface 808 may be configured to provide communications between server system 800 and other computing devices, such as client device 600.

Memory 812 generally comprises random access memory (RAM), read-only memory (ROM), flash memory, and/or other volatile or permanent memory. Memory 812 is shown storing operating system 814 for controlling the operation of server system 800. Server system 800 may also include trained DNN 816, as discussed herein. In some implementations, trained DNN 816 may determine hair pattern types/categories according to the implementations described herein. In other implementations, trained DNN 816 may exist on both server system 800 and/or each client device (e.g., DNN 712).

Memory 812 additionally stores program code and data for providing network services that allow client devices and external sources to exchange information and data files with server system 800. Memory 812 may also include interactive trained DNN 816, which may communicate with data store manager application 818 to facilitate data exchange and mapping between the data store 803, user/client devices, such as client devices 102, 104, and/or 106, external sources, etc.

As used herein, the term "data store" refers to any device or combination of devices capable of storing, accessing and retrieving data, which may include any combination and number of data servers, databases, data storage devices and data storage media, in any standard, distributed or clustered environment. Remote computing resource 800 can include any appropriate hardware and software for integrating with the data store 803 as needed to execute aspects of one or more applications for the client device 600, the external sources, etc.

Data store 803 can include several separate data tables, databases or other data storage mechanisms and media for storing data relating to a particular aspect. For example, data store 803 illustrated includes digital items (e.g., images) and corresponding metadata (e.g., image segments, popularity, source) about those items.

It should be understood that there can be many other aspects that may be stored in data store 803, which can be stored in any of the above listed mechanisms as appropriate or in additional mechanisms of any of the data store. Data store 803 may be operable, through logic associated therewith, to receive instructions from server system 800 and obtain, update or otherwise process data in response thereto.

Server system 800, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 2, 4A, 4B, and 5, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   obtaining a first plurality of content items;
   for each respective content item of the first plurality of content items:
      obtaining an embedding vector representative of the respective content item;
      processing, using a trained machine learning model and without performing pre-processing of the respective content item, the embedding vector to determine a hair pattern for the respective content item; and
      associating the hair pattern with the respective content item;
   determining, based at least in part on a query received from a client device, a second plurality of content items from the first plurality of content items, wherein the second plurality of content items are responsive to the query;
   causing at least a portion of the second plurality of content items and a hair pattern filter control including a plurality of selectable hair patterns to be presented on the client device;
   obtaining, via an interaction with the hair pattern filter control, selection of a first hair pattern from the plurality of selectable hair patterns;
   determining, based at least in part on the first hair pattern, a third plurality of content items, such that each of the third plurality of content items is associated with the first hair pattern; and
   causing at least a portion of the third plurality of content items to be presented on the client device.

2. The computer-implemented method of claim 1, wherein the hair pattern includes at least one of a protective hair pattern, a coily hair pattern, a curly hair pattern, a wavy hair pattern, a straight hair pattern, or a bald/shaved hair pattern.

3. The computer-implemented method of claim 1, wherein at least the portion of the second plurality of content items is presented on the client device according to a diversity associated with the second plurality of content items.

4. The computer-implemented method of claim 1, wherein at least the portion of the third plurality of content items is presented on the client device according to a diversity associated with the third plurality of content items.

5. The computer-implemented method of claim 1, wherein:
processing the embedding vector to determine the hair pattern for the respective content item includes determining a plurality of hair patterns; and
associating the hair pattern with the respective content item includes associating the plurality of hair patterns with the respective content item.

6. The computer-implemented method of claim 1, further comprising:
obtaining, via a second interaction with the hair pattern filter control, a second hair pattern from the plurality of selectable hair patterns,
wherein determining the third plurality of content items from the second plurality of content items is further based on the second hair pattern, such that each of the third plurality of content items is associated with at least one of the first hair pattern or the second hair pattern.

7. A computing system, comprising:
one or more processors;
a memory storing program instructions that, when executed by the one or more processors, cause the one or more processors to at least:
obtain a first plurality of content items, each of the first plurality of content items being associated with a respective hair pattern, wherein each respective hair pattern was determined by a trained machine learning model without pre-processing of each of the first plurality of content items;
determine a second plurality of content items from the first plurality of content items that are responsive to a query received from a client device;
determine, based at least in part on the query, that the query triggers hair pattern filtering of the second plurality of content items;
in response to the determination that the query triggers hair pattern filtering of the second plurality of content items, cause a hair pattern filter control to be presented on the client device, wherein the hair pattern filter control presents a plurality of selectable hair patterns;
obtain an interaction with the hair pattern filter control selecting a first hair pattern from the plurality of selectable hair patterns; and
cause at least a portion of a third plurality of content items to be presented on the client device, wherein each of the third plurality of content items is associated with the first hair pattern.

8. The computing system of claim 7, wherein determining that the query triggers hair pattern filtering further includes, at least:

determining that an inventory of content items of the second plurality of content items associated with at least one of the plurality of selectable hair patterns exceeds a threshold.

9. The computing system of claim 7, wherein the program instructions, that when executed by the one or more processors, further cause the one or more processors to at least:
determine a fourth plurality of content items from the first plurality of content items that are responsive to a second query;
determine that an inventory of content items of the fourth plurality of content items associated with at least one selectable hair pattern from the plurality of selectable hair patterns does not exceed a threshold; and
determine, based at least in part on the determination that the inventory of content items of the fourth plurality of content items associated with each selectable hair pattern from the plurality of selectable hair patterns does not exceed the threshold, that the second query does not trigger hair pattern filtering of the fourth plurality of content items.

10. The computing system of claim 7, wherein each respective hair pattern includes at least one of a protective hair pattern, a coily hair pattern, a curly hair pattern, a wavy hair pattern, a straight hair pattern, or a bald/shaved hair pattern.

11. The computing system of claim 7, wherein the program instructions, that when executed by the one or more processors, further cause the one or more processors to at least:
determine a diversification component associated with the second plurality of content items; and
cause at least a portion of the second plurality of content items to be presented on the client device in an arrangement based at least in part on the diversification component.

12. The computing system of claim 7, wherein presentation of at least the portion of the third plurality of content items is based at least in part on a diversity of the third plurality of content items.

13. The computing system of claim 7, wherein each respective hair pattern associated with each of the first plurality of content items is a primary hair pattern presented in each of the first plurality of content items.

14. The computing system of claim 7, wherein each of the first plurality of content items is associated with more than one respective hair pattern.

15. The computing system of claim 7, wherein determination of each respective hair pattern includes:
processing of an embedding vector representative of each respective content item of the first plurality of content items by the trained machine learning model, wherein the embedding vector includes a binary representation of each respective content item of the first plurality of content items.

16. A computer-implemented method, comprising:
training a machine learning model to determine at least one hair pattern presented in a content item without performing preprocessing on the content item, wherein the at least one hair pattern includes at least one of a protective hair pattern, a coily hair pattern, a curly hair pattern, a wavy hair pattern, a straight hair pattern, or a bald/shaved hair pattern;
processing, using the trained machine learning model, a plurality of embedding vectors associated with a plurality of content items to determine a presented hair pattern for each of the plurality of content items, wherein each of the plurality of embedding vectors is representative of a corresponding one of the plurality of content items;

determining, based at least in part on a query received from a client device, a second plurality of content items from the first plurality of content items, wherein the second plurality of content items are responsive to the query;

causing a hair pattern filter control to be presented on a client device;

obtaining, via an interaction with the hair pattern filter control, selection of a first hair pattern;

determining, based at least in part on the first hair pattern, a third plurality of content items, such that each of the third plurality of content items is associated with the first hair pattern; and causing at least a portion of the third plurality of content items to be presented on the client device.

17. The computer-implemented method of claim 16, further comprising:

determining, based at least in part on the query, that the query triggers hair pattern filtering of the second plurality of content items.

18. The computer-implemented method of claim 16, further comprising:

determining a hair pattern inventory of the second plurality of content items; and determining, based at least in part on the hair pattern inventory, a plurality of selectable hair pattern options to be included in the hair pattern filter control that is presented on the client device.

19. The computer-implemented method of claim 16, wherein presentation of at least the portion of the third plurality of content items is based at least in part on a diversity of the third plurality of content items.

20. The computer-implemented method of claim 16, further comprising:

providing the machine learning model with a plurality of labeled content items as a training dataset to train the machine learning model, wherein a label associated with each of the plurality of labeled content items is determined based on a plurality of labels.

* * * * *